United States Patent [19]

Inaba

[11] Patent Number: 4,765,894
[45] Date of Patent: Aug. 23, 1988

[54] APPARATUS FOR SEPARATION OF SOLID FROM LIQUID

[76] Inventor: Mitsuru Inaba, No. 628, Jomyoji, Kamakura-shi, Kanagawa-ken, Japan

[21] Appl. No.: 927,495

[22] Filed: Nov. 6, 1986

[30] Foreign Application Priority Data

Nov. 7, 1985 [JP] Japan .......................... 60-170456[U]

[51] Int. Cl.[4] .............................................. B01D 33/22
[52] U.S. Cl. ..................................... 210/393; 210/391
[58] Field of Search ............... 210/168, 171, 196, 327, 210/333.01, 333.1, 391, 393, 411, 412, 416.5

[56] References Cited

U.S. PATENT DOCUMENTS

| | | | |
|---|---|---|---|
| 1,804,934 | 5/1931 | Hoyt | 210/391 |
| 2,458,139 | 1/1949 | Boucher | 210/391 |
| 3,585,924 | 6/1971 | Nolan | 100/43 |
| 4,431,541 | 2/1984 | Lee | 210/412 |

FOREIGN PATENT DOCUMENTS

| | | | |
|---|---|---|---|
| 590916 | 1/1960 | Canada | 210/393 |
| 591659 | 2/1960 | Canada | 210/327 |

Primary Examiner—Richard V. Fisher
Assistant Examiner—Linda S. Evans
Attorney, Agent, or Firm—Young & Thompson

[57] ABSTRACT

An apparatus for separating solids from various types of liquid is disclosed, which includes a vessel for a filtrate arranged adjacent to one side wall of receiving vessel for a solid-containing liquid, and a disc screen arranged at an opening of the side wall using a liquid seal, the disc screen being connected to a rotary shaft which in turn is connected to a driving source, while the disc screen at its surface of the filtrate vessel side being opposed with a submerged ejecting nozzle for a washing fluid thereby to backwash the disc screen during its rotation, resulting in an excellent solid/liquid separator having capability of preventing the clogging of the solids in the screen and continuous operation, as well as the compactness and high capacity of the apparatus. The apparatus according to the invention may be applied effectively to the separation of, for example, chips from a coolant for various machines.

1 Claim, 2 Drawing Sheets

{ 4,765,894 }

APPARATUS FOR SEPARATION OF SOLID FROM LIQUID

FIELD OF THE INVENTION

This invention relates to an apparatus for filtering solids from a solid-containing liquid through a screen and transporting the separated solids.

BACKGROUND OF THE INVENTION

Heretofore, various apparatus for removing relatively large machined chips have been proposed and utilized for treating these chips produced by machine tools. However, these apparatus cannot remove fine chips, which in turn are collected together with a machining fluid in a coolant tank and precipitated therein. Thus, if a large amount of the fine chips precipitates in the coolant tank, the capacity of the tank is insufficient for the coolant, which overflows from the tank. As a result, a fire accident may occur due to the oily property of the coolant. Futher, circulation of the unremoved chips together with the coolant may block an ejecting nozzle for the coolant, thereby to cause damage of the tools and reduced quality of the machined products. Futhermore, a settling disorder may arise in a machining center upon replacement of automatic tools, thereby adversely affecting the machining accuracy.

In view of the foregoing, an apparatus of such a type has been proposed that a conventional coolant tank is provided at its inner bottom with a screw conveyor for removing the precipitated chips therefrom. In such type of apparatus, however, the conveyor was generally arranged horizontally in consideration of its conveying capacity and was impossible to be arranged obliquely for the purpose of reducing the settling area.

Since most of the machined chips are generally magnetic in nature, an apparatus provided at its bottom with a magnetic plate has also been proposed to aggregate the magnetic chips at the bottom within the tank, from which they are scraped and removed by a scraper. Such apparatus, however, necessitates also enlargement of the settling area for the magnetic plate in order to increase the aggregation, thereby requiring a large size of the scraper. Thus, the apparatus has a further disadvantage in that only a very limited amount of non-magnetic chips may be removed.

For solving the foregoing problems, there has been proposed an apparatus for filtering the chips from chip-containing liquid, such as a coolant, by use of a filtering means, such as a screen, and transporting the chips on a screw conveyor, as disclosed in U.S. Pat. No. 3,585,924. However, with the apparatus of such type it often becomes unable to filter the chips due to adhesion and clogging of the chips on the screw conveyor for cleaning the filtering means, resulting in a time-consuming, troublesome and inefficient operation.

Accordingly, it has long been needed to provide an apparatus for treating chips, which is compact and achieves efficient recovery and removal of the chips, as well as reduction of the equipment cost.

It has now been found that suspended and precipitated solids in liquid may be surely filtered by arranging a filtrate vessel adjacent to one side of a receiving vessel for a solid-containing liquid, providing a rotatable disc screen between the receiving vessel and the filtrate vessel for causing these vessels to communicate with each other, and arranging an ejecting nozzle for ejecting a washing fluid which is directed against the screen from its filtrate vessel side, resulting in the effective cleaning of the screen and thus efficient operation of the apparatus.

Due to its ability to perform effective and continuous filtration of the solids through the screen, the apparatus may be compact in construction and have the ability to treat a large quantity of the liquid containing chips. Further, the compactness of the apparatus requires less volume and less space for its accommodation.

Accordingly, an object of the invention is to provide an apparatus for separation of solids from a liquid, which has the advantages of compactness, efficient filtration, convenient maintenance, small space for placement, and reduced cost of equipment.

SUMMARY OF THE INVENTION

In order to achieve the above object, the invention provides a solid/liquid separator, which comprises a vessel for a filtrate arranged adjacent to one side wall of a receiving vessel for a solid-containing liquid, and a disc screen arranged at an opening of the side wall using a liquid seal, said disc screen being connected to a rotary shaft which in turn is connected to a driving source, said disc screen at its surface on the filtrate vessel side being opposed with an ejecting nozzle for a washing fluid, thereby to back-wash the disc screen during its rotation.

The invention will be described hereinbelow in more detail for better understanding with reference to preferred embodiments shown in the accompanying drawings.

PREFERRED EMBODIMENTS OF THE INVENTION

Figure 1:
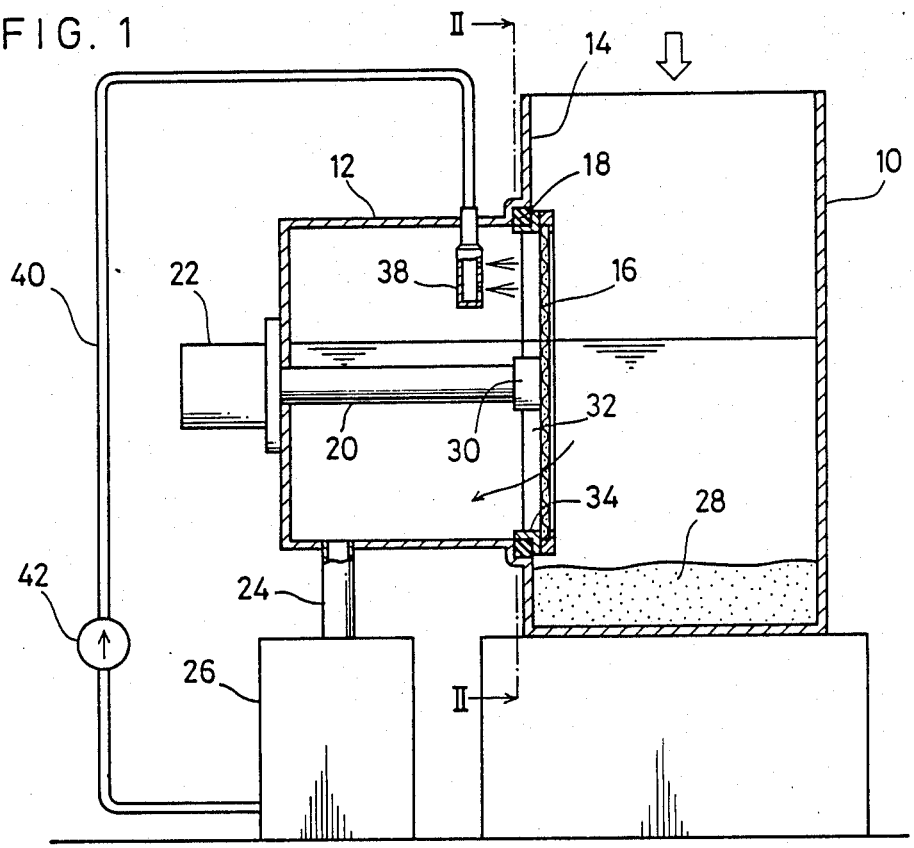
FIG. 1 is a schematic side sectional view of one embodiment of the solid/liquid separator according to the invention.
Figure 2:
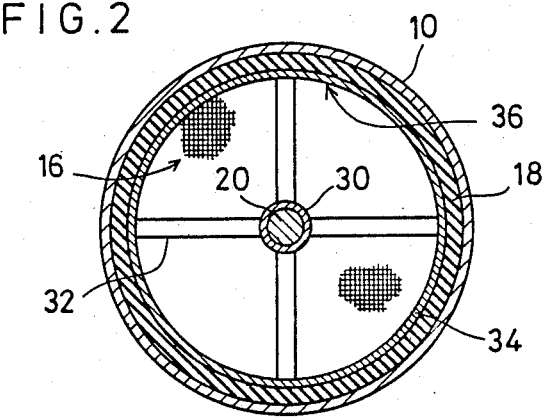
FIG. 2 is a sectional view taken along the line II—II in FIG. 1.

FIGS. 1 and 2 illustrate one embodiment of the apparatus for solid/liquid separation according to the invention. In FIG. 1, reference 10 represents a receiving vessel for receiving a solid-containing liquid, while reference 12 represents a filtrate vessel arranged adjacent to one side wall 14 of the receiving vessel 10. The side wall 14 is provided with a disc screen 16 by means of a peripheral sealing material 18, through which screen the receiving vessel 10 and the filtrate vessel 12 are in communication with each other. The disc screen 16 at its center is connected to one end of a rotary shaft 20, the other end of which in turn is rotatably connected to a driving source 22, such as an electric motor. From the filtrate vessel 12 is extended a pipe 24 which is in communication with a storage tank 26 for collecting a filtrate. The separated solids 28 may be deposited from the solid-containing liquid onto the bottom of the receiving vessel 10.

Especially in accordance with the invention, the disc screen 16 may be made not only of a wedge wire or mesh screen in the range of 60 to 200 mesh size but also of a punched plate with or without a nylon or teflon net. In order to mount the disc screen 16 rotatably on the rotary shaft 10, as shown in FIG. 2, there is provided a supporting element 36 comprising a boss 30 mounted on the front end of the rotary shaft 20, a plurality of arms 32 protruding radially outward from the boss 30, and a ring element 34 attached peripherally to the arm 32, while the screen material is extended over the supporting element 36.

The disc screen 16 thus constructed may filter the solids deposited thereon when the receiving vessel 10 receives the solids-containing liquid, and may feed the filtrate appropriately to the filtrate vessel 12. The deposited solids on the screen 16 cannot be readily removed, however, merely by rotation of the disc screen 16. According to the invention, therefore, the filtrate vessel 12 at its inner portion is provided with an ejecting nozzle 38 for a washing fluid which is directed against the rotating screen surface in order to achieve back-washing. For this purpose, the washing fluid may be either a clean gas or liquid when the nozzle 38 is located above the filtrate level in the vessel 12. Preferably, however, the storage tank 26 and the ejecting nozzle 38 may be connected by means of a pipe 40, as shown in FIG. 1, which pipe at its lower portion is provided with a pump 42 for utilizing the filtrate as the washing liquid.

The most effective back-washing of the disc screen 16 may be achieved depending on the outer diameter and mesh size of the screen 16, the rotation rate, etc. Preferably, an outer diameter of 100 to 500 mm, a mesh size of 60 to 200, a rotation rate of 1 to 50 r.p.m., a washing fluid pressure of about 1 to 3 kg/cm$^2$ and an ejecting flow rate of 20 to 50 l/min may be usually effective for the back-washing.

Further, the back-washing by the washing fluid against the disc screen 16 may be carried out either continuously or batchwise. In addition or alternatively to the nozzle 38, the screen surface on the receiving vessel side is contacted with a scraper (not shown) when the deposited solids are difficult to be eliminated, thereby to forcibly scrape off the deposited solids from the surface for improving the washing effect.

In operation of the solid/liquid separator of the above embodiment, the disc screen 16 is rotated by the electric motor 22 while the coolant containing the solids 28, such as chips, is introduced into the receiving vessel 10. Thus, the disc screen may filter the solids 28 and pass the coolant through the screen to the storage tank 26 via the filtrate vessel 12. A portion of the filtered solids remains deposited on the screen surface but is subjected to the back-washing action of the washing fluid from the nozzle 38, thereby to fall by its own gravity onto the bottom of the receiving vessel 10 for deposition. The deposited portion of the solids 28 may be optionally removed automatically or intermittently from the bottom of the receving vessel 10 by a conveyor (not shown) which is optionally arranged under the receiving vessel 10.

Figure 3:
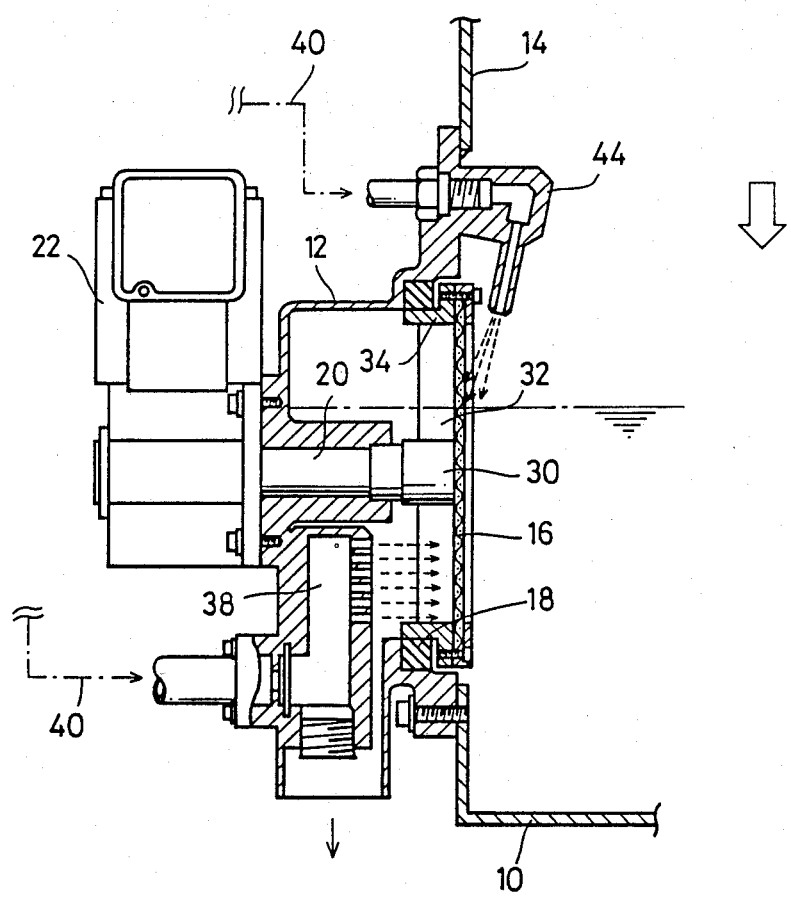
FIG. 3 is a sectional side view of main portions of another embodiment according to the invention.

FIG. 3 illustrates another embodiment of the apparatus according to the invention, wherein the same references are used for the same elements of the previous embodiment while omitting the detailed description thereof. According to this embodiment, the ejecting nozzle 38 for the washing fluid is immersed in the filtrate, while the receiving vessel 10 at its upper portion is provided with another nozzle 44 for a surface washing fluid so as to be directed against the surface of the screen 16 with a certain degree of inclination (an acute angle). Otherwise, the construction is substantially same as in the apparatus shown in FIG. 1. As the driving source 22 connected to the rotary shaft 20 for rotating the disc screen 16, there may be employed a direct connection of the rotary shaft 20 with a driving shaft of the electric motor, a gear connection system or a transmission system utilizing an endless chain or belt connected with a remote electric motor.

In the operation of the solid/liquid separator according to this embodiment, the electric motor is driven to rotate the disc screen 16 for filtering the solid-containing coolant introduced into the receiving vessel 10, as described for the previous embodiment. The screen 16 may filter the solids 28 and pass the filtrate therethrough. In this embodiment, however, the ejecting nozzle 38 immersed in the filtrate may eject the washing liquid for back-washing the deposited solids on the screen 16 and subsequently the other nozzle 44 may eject the washing fluid against the surface of the disc screen 16, thereby to ensure removal of the solids remaining unseparated after the back-washing.

As will be apparent from the embodiments described hereinabove, in accordance with the invention the solid/liquid separation may be achieved by the rotating disc screen, and the disc screen may be back-washed continuously or intermittently by the washing fluid, thereby to prevent clogging due to adhesion of the solids, to maintain the effective solid/liquid separation and to enhance the treating capacity considerably.

Further, the separated solids may be automatically collected and removed by an optional conveyor system.

Thus, the apparatus according to the invention may be constructed in a compact type, requires less space for placement, and is convenient in maintenance of the disc screen with its separating function, thereby to significantly reduce the production and maintenance cost of the apparatus. In particular, the solid/liquid separator according to the invention may be conveniently and readily attached to a conventional existing solid/liquid separating tank. Further, any number of such apparatus may be arranged for selectively setting or improving the treating capacity of the solid-containing liquid.

Although the invention has been described hereinabove with reference to the preferred embodiments, it will be appreciated that the apparatus according to the invention may be widely applied to various machine tools, such as a cutter, a grinder, a rolling mill, a scrubber, a honing machine and others, for separating inorganic suspended matter (such as iron chips) from a machining oily fluid or an engine oil, or to a solid/liquid separator for a liquid containing sand or activated carbon, and that many variations and modifications may be made without departing from the true spirit and scope of the invention.

What is claimed is:

1. A separator for separating machined chips from a coolant, which comprises a receiving vessel for chip-containing coolant, a vessel for filtered coolant disposed next to the receiving vessel, a disc screen through which said vessels communicate with each other, a rotary shaft for rotating said disc screen, means for rotating said rotary shaft thereby to rotate the disc screen, a submerged ejecting nozzle in the filtrate vessel for propelling a fluid against the disc screen thereby to back-wash the disc screen during its rotation, and another ejecting nozzle for ejecting a fluid against the disc screen within the receiving vessel thereby readily to release and remove chips deposited on the surface of the disc screen within the receiving vessel, there being liquid in said receiving vessel having a liquid level, the first-mentioned nozzle being so disposed as to direct fluid against the screen below said liquid level and the second-mentioned nozzle being so disposed as to direct fluid against the screen above said liquid level.

* * * * *